United States Patent [19]

Khurgin et al.

[11] 4,433,577
[45] Feb. 28, 1984

[54] APPARATUS FOR METERING LIQUID FLOW

[76] Inventors: Boris Khurgin, 14 David Marcus St., Haifa, Israel; Shlomo Rosinek, 149 Levi Eshkol St., Kiron, Israel; Isaac Rinkewich, 53 David Hamelech Blvd., Tel-Aviv, Israel, 64237

[21] Appl. No.: 270,226

[22] Filed: Jun. 4, 1981

[51] Int. Cl.³ .................. G01F 23/00; A01J 7/00
[52] U.S. Cl. .................. 73/290 V; 73/304 C; 119/14.17
[58] Field of Search ............... 119/14.08, 14.14, 14.15, 119/14.16, 14.17, 14.18; 73/304 C, 290 V, 301

[56] References Cited

U.S. PATENT DOCUMENTS

| | | | |
|---|---|---|---|
| 2,361,738 | 10/1944 | Bird | 73/301 |
| 3,623,366 | 11/1971 | Rowell | 73/301 |
| 4,090,407 | 5/1978 | Shuler et al. | 73/290 V |
| 4,173,892 | 11/1979 | Khurgin | 73/304 C |
| 4,175,514 | 11/1979 | Souza et al. | 119/14.08 |
| 4,185,586 | 1/1980 | Flocchini | 119/14.15 |
| 4,231,324 | 11/1980 | Schletter | 119/14.17 |
| 4,325,028 | 4/1982 | Takahashi | 119/14.14 X |

*Primary Examiner*—Hugh R. Chamblee
*Attorney, Agent, or Firm*—James & Franklin

[57] ABSTRACT

An inlet tube, connected to a source of liquid, such as milk, supplies liquid to the top of a container. An orifice at the bottom of the container permits drainage from the container into an outlet tube. The level of liquid in the container is related to the instantaneous flow rate, in a known manner, as long as the pressure in the container, above the liquid surface, equals the pressure in the outlet tube after the orifice. A conduit connects the upper portion of the container, at a point above the liquid therein, and the outlet tube, below the orifice, to equalize the pressure therebetween, as well as to act as an overflow bypass. Various types of sensors may be used to determine the level of liquid in the container. A signal, representative of the sensed liquid level, is developed and processed to represent the flow rate.

9 Claims, 21 Drawing Figures

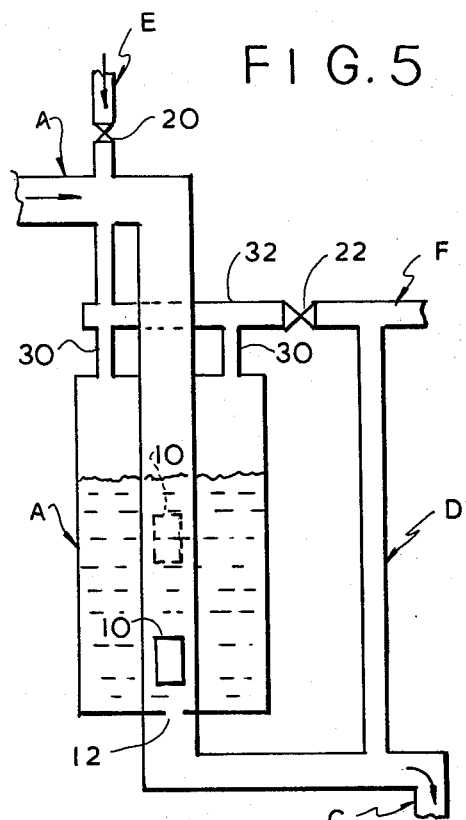
FIG. 5
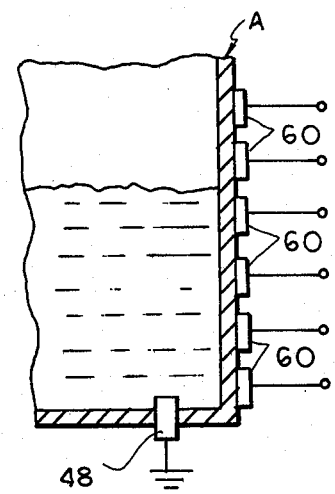
FIG. 9
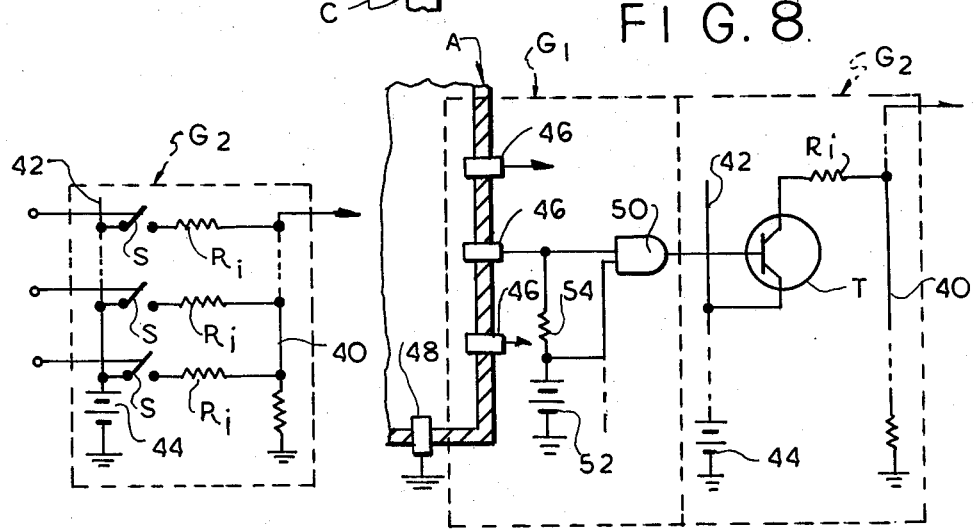
FIG. 8
FIG. 7

FIG. 12
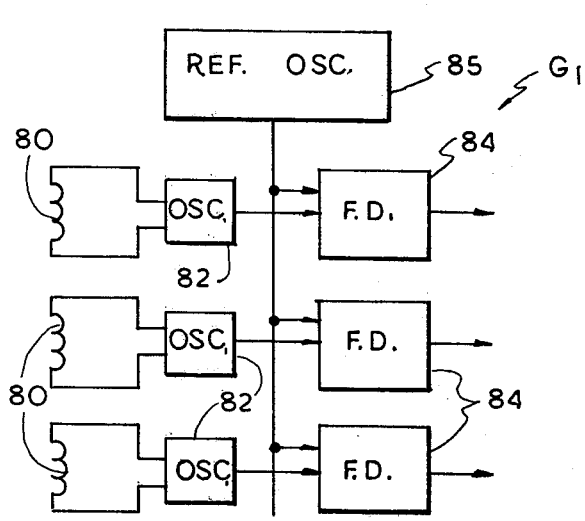
FIG. 15
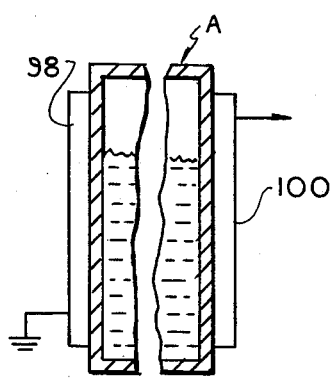
FIG. 14
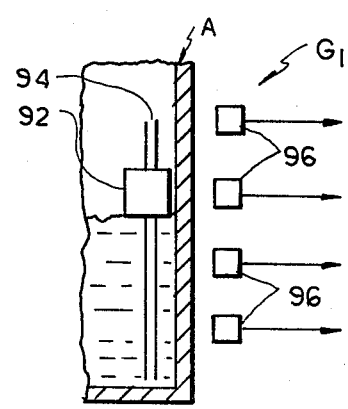
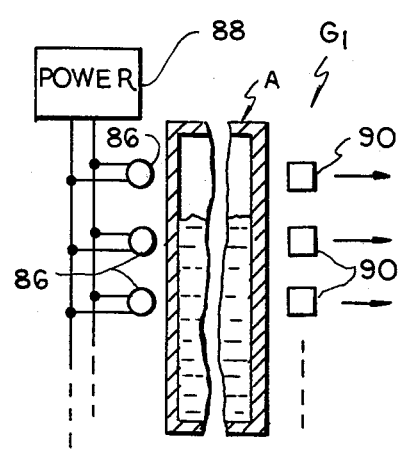
FIG. 13

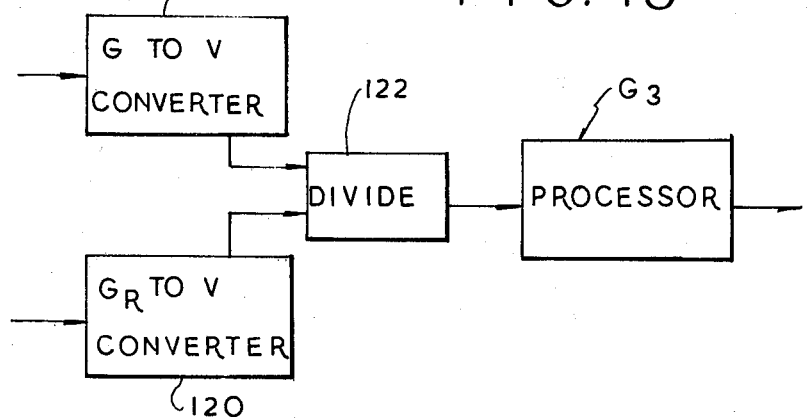
FIG. 19
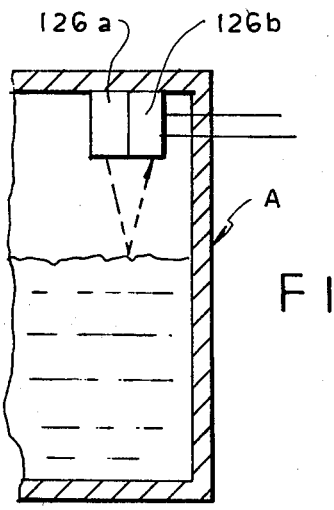
FIG. 20
FIG. 21
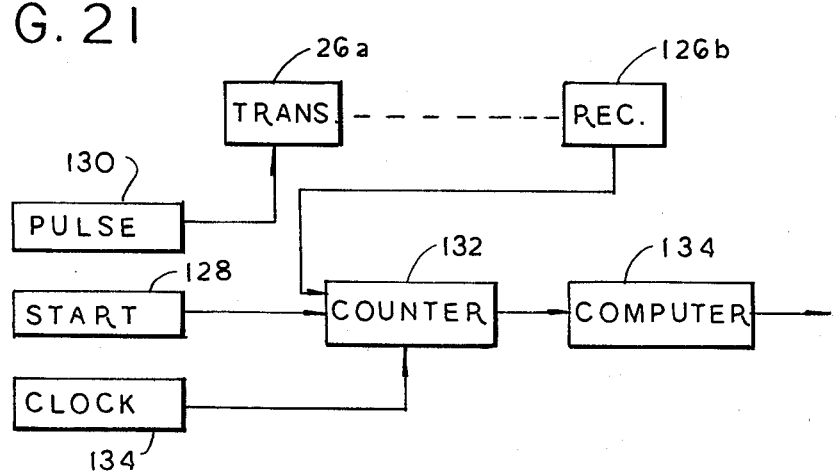

APPARATUS FOR METERING LIQUID FLOW

The present invention relates to apparatus for measuring liquid flow and, more particularly, to apparatus designed for the measurement of irregular liquid flow on a "flow-through" basis and for determining the total liquid volume over a given time interval. The invention is particularly well suited for the measurement of milk yield of individual cows in a dairy farm and can be used in conjunction with automatic milking machines of conventional design.

Until recently, milk yields from individual cows were measured only on an occasional basis because taking accurate measurements is time consuming and requires additional equipment, as well as skilled personnel to operate same. Modern experience indicates that the daily measurement and recording of the milk yield for each cow in a herd can enhance the overall milk production significantly. The data obtained from daily measurement of milk yield enables the owner of the herd to detect problems quickly and to react to same by taking the necessary steps to maintain the optimum milk yield for each animal, either by altering the feed mix, administering medication, or the like. In spite of the usefulness of this data, to be practical, measurements must be capable of being made without imposing additional work load on the personnel, who are already fully occupied by caring for the livestock.

Apparatus for the measurement of quantities of liquid, such as milk, on a batch basis, are known. One example of such apparatus is disclosed in U.S. Pat. No. 4,173,892, issued on Nov. 13, 1979 to Boris Khurgin, one of the co-inventors herein, and entitled: "Apparatus For Measurement of Quantity of Liquid in Container". This apparatus is designed to generate an electrical signal proportional to the total milk volume in a container of glass or similar non-conducting material. The container is provided, on its exterior surface, with a pair of spaced, opposed electrodes which operate like the plates of a capacitor, with the container and its contents acting as a dielectric. The capacitance of the container is sensed and an electrical signal generated which is representative thereof. The properties of the dielectric and, thus, the sensed capacitance change in accordance with the volume of liquid within the container. Since the physical properties of the container do not change, the quantity of liquid in the container is thus ascertained by the magnitude of the generated signal.

This system has been found to produce very accurate results. However, the use thereof entails considerable extra work and time on the part of the dairy personnel because it is a batch-type process, wherein measurement can be made only after all of the milk from the cow is situated in the container. Metering during milking is not possible because liquid flowing into the container, and thus between the capacitor surfaces, interferes with the accurate measurement of the capacitance which is a result of the liquid in the container. Moreover, such containers, because of their dimensions, require installations which are relatively high. For this reason, many modern dairy farms have converted to "in-line" milking systems.

In order to reduce the time and effort associated with making accurate measurements of daily milk yields for each cow, a flow-through liquid measuring apparatus has been developed. This apparatus, in its simplest form, comprises two concentric vertical tubes. The exterior surface of each tube is provided with a metallic coating which acts as an electrode. Each electrode is electrically isolated from each other, so as to form a capacitor. The inner of the two concentric tubes is connected at its upper end to a pipe conveying milk from a milking machine. This tube has a constriction or orifice at its bottom which is dimensioned so as to maintain the liquid level in the tube above the restriction, as long as milk flows through the apparatus. The inner tube and the outer tube communicate through openings in the inner tube wall adjacent the restriction, causing the liquid to rise to the same level in both tubes.

The capacitance between the plates changes in proportion to the liquid level in the space between concentric tubes. The two electrodes are connected to an electronic circuit which generates a voltage output proportional to the capacitance. The milk level in the apparatus changes in proportion to the square of the milk flow rate through the restriction. The electronic circuit is designed to take the square root of the voltage output, in order to obtain a signal which is proportional to milk flow rate. This function is then integrated over the interval of time for the milking operation, so as to obtain the total milk yield.

For health reasons, milking machines and associated hardware designed to handle the flow of milk, must be capable of being sanitized and completely cleaned of all milk residue at regular intervals. Any apparatus, such as one which measures the flow of milk, must also have this capability, so as to prevent contamination.

Aside from high initial cost, one significant drawback of the double tube design is the difficulty inherent in keeping the apparatus clean and sterile, as required. Another drawback, which is common to all types of apparatus employing opposed capacitor surfaces separated by a liquid, is that milk, or any other liquid, when it is receding, forms a thin layer or coating which remains on the interior tube walls for a certain period of time. This residue causes the instruments to falsely detect a higher capacitance than which corresponds to the actual milk level. Although this error is relatively small, it nevertheless causes inaccurate final results of the milk yield and, thus, this type of apparatus may not be suitable in cases where extremely accurate results are required.

In view of the above-mentioned drawbacks, it is a prime object of the present invention to provide apparatus for metering liquid flow which utilizes a flow-through design which provides accurate results over a large range of flow velocities.

It is a further object of the present invention to provide apparatus for metering a liquid flow which is readily cleanable and which has no corners or recesses which hinder the cleaning operation.

It is a further object of the present invention to provide apparatus for metering a liquid flow which is adaptable for use in conjunction with a conventional automatic milking machine.

It is another object of the present invention to provide apparatus for metering liquid flow which is readily adapted for use in conjunction with digital measuring, indicating, and recording equipment.

It is a further object of the present invention to provide apparatus for metering liquid flow which includes electronic sensing devices of standard design.

It is still another object of the present invention to provide apparatus for metering liquid flow which is composed of simple, relatively inexpensive parts which interact reliably so as to provide a long, maintenance-free life.

In accordance with the present invention, apparatus is provided for measuring the rate of flow of a liquid from a source. The apparatus includes a container and an inlet tube connected to the liquid source. The container comprises an inlet port, connected to the inlet tube, through which liquid is supplied to the container. An orifice is situated at the bottom of the container to permit liquid to drain from the container at a known rate. An outlet tube is operably connected to the orifice. Means are provided which operably connect the container, at a point above the liquid therein, and the outlet tube, for equalizing the pressure therebetween. Means are provided for sensing the liquid level in the container and for generating a signal representative of the instantaneous rate of liquid flow through the container in accordance therewith.

The apparatus includes bypass means, operably connecting the container and the outlet tube, for permitting liquid situated above a given level in the container to bypass the orifice and flow directly into the outlet tube. Preferably, the pressure equalizing means and the overflow bypass means comprise a single means which takes the form of a conduit connecting the upper portion of the container and the outlet tube.

The apparatus may be used in conjunction with suction means which form a portion of an automatic milking machine. When so used, means are provided for operably connecting the suction means and the inlet tube, such that milk is drawn through the tube and into the container by the suction action of the machine.

The apparatus may also be used in conjunction with an automatic cleaning system which includes a source of cleaning fluid. The apparatus comprises means for operably connecting the container to the cleaning fluid source. Means are also provided for operably connecting the fluid cleaning source to the pressure equalizing means. In this manner, the entire apparatus may be cleaned efficiently.

The signal generating means includes means for detecting the level of the liquid surface in the container, means for generating an analog signal representative of the detected surface level, and means for converting the analog signal into a digital signal representative of the liquid flow rate. Further, means may be provided for integrating the digital signal over a given time period and for generating a signal representative of the total liquid volume flow through the container, during the time period.

One category of detecting means comprises a plurality of sensors. The sensors are situated along the vertical surface of the container. Each of the sensors generates an output which represents the presence or absence of liquid adjacent to its location. Means are provided for energizing the sensors.

When used in conjunction with a plurality of sensors, the analog signal generating means comprises a voltage source, an output bus and a plurality of individually actuatable switch means, such as a transistor or the like. Each switch is situated in a different one of a plurality of parallel circuit branches between the source and output bus. Each of the switches is associated with a different sensor. Each switch has a control input, which is responsive to the output of the associated sensor, and an output circuit, connected between the voltage source and the output bus. Each of the switch means is effective, when the control input thereof is actuated by the output of the sensor associated therewith, to connect the voltage source to the output bus. In this way, the voltage on the output bus is the analog of the liquid level.

Each switch has a resistor in series with its output circuit and, thus, between the source and the output bus when the switch is actuated. The resistance values of the resistors are chosen according to a predetermined plan.

For example, if the sensors are of the type that all of the sensors which are below the surface level will actuate the associated switches, then the resulting voltage on the output bus will depend upon an equivalent resistance of all the resistors, connected in parallel. This is termed a "cumulative circuit".

If, on the other hand, the electronic scheme of sensors connection to switches is such that only the one nearest the surface level will actuate the associated switch, the resistance value associated with each switch must be unique. Thus, the actuation of a particular switch results in the application of a particular voltage on the output bus and that voltage represents a particular sensor and, thus, a particular surface level. Herein, this is termed a "differential" circuit.

In one embodiment, the sensors comprise electrodes which extend through spaced openings in the wall of the container. The liquid in the container is grounded and the resistance between each individual electrode and ground is sensed. Each electrode is effective to actuate the control input of the switch means connected thereto, when the electrode is immersed in the liquid, such that the resistance between it and ground drops below a predetermined level. A cumulative circuit is used to generate an analog signal representative of liquid level.

In a second preferred embodiment, each of the sensors comprises a conductive plate, affixed to the exterior of the container. The liquid in the container is grounded. Means are provided for actuating the switch means associated with each sensor when the capacitance of the sensor plate is beyond a given level. A cumulative circuit is used to generate the analog output.

In a second version of these embodiments, means are provided for comparing the capacitance of adjacent sensor plates (or resistance between adjacent electrodes and ground) and for actuating the switch means associated with the plate which has a capacitance different from the capacitance of the next plate (or with the electrode, whose resistance relative to the ground differs from that one of the next electrode). In this way, the level or height of the liquid is ascertained and, by using resistors of chosen values, converted into an analog signal representing, in a known way, an instant value of a flow rate.

In another preferred embodiment of the present invention, each sensor comprises a wire coil surrounding at least a portion of the container. An oscillator, provided for each coil, is tuned to a given frequency and connected to excite the coil. A conductive float is situated within the container to indicate the surface of the liquid. A reference oscillator, tuned to the same frequency as the previously mentioned oscillators, is provided. A plurality of frequency discriminator circuits are used. Each of the discriminators is operably connected to one of the coils and to the reference oscillator. Each frequency discriminator circuit is effective, when the frequency of the coil connected thereto differs from that of the reference oscillator, to generate an actuation signal to the switch means associated with the sensor closest to the float, thereby indicating the liquid level. A differential circuit is used to generate the analog voltage.

In another preferred embodiment, each of the sensors comprises a magnetically actuated switch, used to detect a magnetic float. The switch generates an actuation signal to the switch means associated therewith, when the presence of the float is detected. A differential circuit is used to generate the analog signal.

In another preferred embodiment, each of the sensors comprises photo-sensitive signal generating means which is responsive to a light source located on opposite sides of the container. Each photo-sensitive means generates an actuation signal to the switch means associated therewith, when light from the corresponding source is detected. A cumulative or a differential circuit is used to generate the analog signal.

In another category of sensing devices, a parameter of the overall liquid quantity at a given moment is measured. In one embodiment, the signal generating means comprises means for measuring the capacitance of the container as a whole and for generating an analog signal in accordance with the measured capacitance. In one version, first and second electrodes are situated, in spaced relation, on opposite sides of the exterior of the container with the liquid therebetween. In a second version, the apparatus comprises concentric tubes, the inner one of which is grounded. The outer tube has an electrode surrounding it. In either case, a power source is connected to one electrode and means are provided for grounding the other electrode. The electronics converts the capacitance detected into a voltage.

In another preferred embodiment, the signal generating means comprises a pressure transducer located near the orifice and means for converting the sensed pressure level into an analog signal representative of the liquid surface level.

In still another preferred embodiment, the detecting means comprises an ultra-sonic transmitter, an ultra-sonic receiver, and means for measuring the time it takes for a generated sound wave to traverse the distance from the transmitter to the liquid surface and to the receiver. The time measurement is then converted into a signal representative of the liquid level.

In still another preferred embodiment, the signal generating means comprises a means for generating a first signal, representative of the total conductance of the liquid in the container and means for generating a second signal representative of the conductance of a known quantity of the liquid, which is directly proportional to a specific conductance of a liquid. Means are also provided for processing the first and second signals to form an analog signal representative of the flow rate.

The apparatus of the present invention operates on a relatively simple principle of fluid dynamics. A liquid is caused to flow into a container which is provided with a narrow drain opening or orifice of known dimensions. In such a situation, the liquid level in the container is known to rise to a height (H) which is directly proportional to the square of the drain velocity through the orifice, as long as the pressure above the liquid surface is equal to the pressure in the outlet tube below the orifice.

The equation for the relation of the height (H) of the liquid above the outlet orifice to the liquid flow rate (q) (in kilograms/second) is as follows:

$$q = K\sqrt{2gH}$$

wherein K is a constant relating to the physical properties of the orifice and the viscosity of the liquid, and g is the constant of gravitational acceleration.

It is important to note that the mathematical relationship between the flow rate (q) and the height (H) of the liquid surface, noted above, holds true only if the pressure above the surface of the liquid equals the pressure in the outlet tube after the orifice. It is therefore necessary to include means as a part of the apparatus by which the top of the container above the liquid surface is connected to the outlet port below the orifice. This is accomplished by an additional conduit or tube connecting the upper portion of the container and the outlet tube. This tube may be situated within or outside the container, as desired. As noted above, this tube may also act as an overflow bypass in the event that the orifice becomes clogged or the liquid flow is of a larger rate than which can be handled by the orifice.

To these and such other objects which may hereinafter appear, the present invention relates to apparatus for metering the flow of a liquid, as described in the following specification, and recited in the annexed claims, taken together with the accompanying drawings, wherein like numerals refer to like parts, and in which:

FIG. 1 schematically illustrates a preferred embodiment of the apparatus of the present invention in its most basic form;

FIG. 2 schematically illustrates a preferred embodiment of the present invention which can be used in conjunction with a source of cleaning fluid;

FIG. 3 schematically illustrates another preferred embodiment of the present invention which can be utilized in conjunction with a suction-type automatic milking machine;

FIG. 4 schematically illustrates another preferred embodiment of the present invention which includes a settling chamber which can be used in conjunction with a source of cleaning fluid and a suction-type automatic milking machine;

FIG. 5 schematically illustrates a preferred embodiment of the present invention in which a concentric tube-type design is utilized and which can be used in conjunction with a source of cleaning fluid and an automatic milking machine;

FIG. 7 shows, schematically, a preferred embodiment of the analog signal generating means of the present invention;

FIG. 8 shows a preferred embodiment of the electronics of the present invention wherein resistance sensing electrodes are utilized;

FIG. 9 shows a preferred embodiment of the present invention wherein capacitive plates are used as sensors;

FIG. 12 shows a preferred embodiment of the present invention wherein frequency discriminators are utilized to sense liquid level;

FIG. 13 shows a preferred embodiment of the liquid level sensing means of the present invention which utilizes photo-electric cells;

FIG. 14 shows a preferred embodiment of the liquid level sensing means of the present invention wherein magnetically actuated switches are utilized to sense the liquid level;

FIG. 15 illustrates a preferred embodiment of the liquid level sensing means of the present invention wherein the capacitance of the container is measured in order to sense the liquid level;

FIG. 19 is a preferred embodiment of the analog signal generating means which can be used in conjunction with the liquid level sensing means disclosed in FIG. 18;

FIG. 20 illustrates a preferred embodiment of the liquid level sensing means utilizing ultra-sonic transducer to sense the liquid level; and FIG. 21 is a block diagram of the analog signal generating means which can be used in conjunction with the liquid level sensing means illustrated in FIG. 20.

Figure 1:
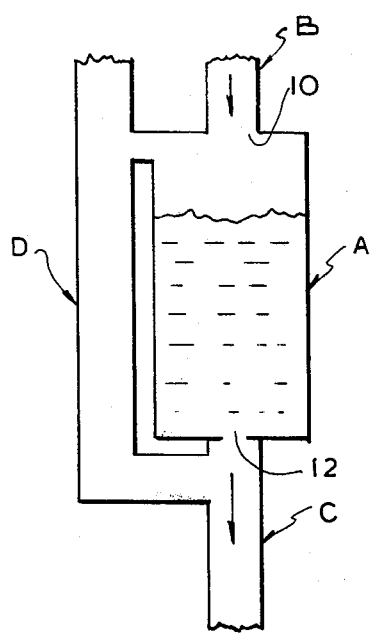

FIG. 1 shows the metering device of the present invention in its most basic form. As shown in this figure, the device comprises a substantially upstanding or vertical container, generally designated A, of any appropriate dimensions, having a liquid inlet port 10 at or near the top thereof. Liquid inlet port 10 is connected to an inlet tube or conduit, generally designated B, which connects inlet port 10 to a source of liquid (not shown). At the bottom of container A is an outlet orifice 12 of known dimension, situated to permit the liquid in container A to drain from the container into an outlet tube, generally designated C. Outlet tube C is much larger in diameter than orifice 12, such that the liquid flows freely therein.

Since the height of the liquid surface in container A is related to the liquid flow rate through the orifice in the manner set forth by the mathematical equation above, the instantaneous rate of flow of the liquid can be calculated at any time by detecting the location of the liquid surface.

However, as noted above, the mathematical relationship between the liquid height and the liquid flow rate through the orifice holds true only if the pressure above the surface of the liquid equals the pressure in the outlet tube C after orifice 12. Thus, some means is required to assure that the pressure in container A, above the liquid surface, is always equal to the pressure in outlet tube C, below orifice 12. This means comprises a conduit, generally designated D, which is connected between a point above the liquid level in container A and a point in outlet tube C below orifice 12. Conduit D also serves as an overflow bypass conduit preventing liquid from backing up through inlet port 10 in the event that orifice 12 becomes clogged or the inflow of liquid becomes greater than the capacity of the apparatus.

While the pressure equalizing means and the overflow bypass means can be embodied in separate conduits, if desired, it is preferable to use a single conduit to provide both functions. It should also be noted that although FIG. 1 shows conduit D external to container A, conduit D can also be situated within container A and still provide the same dual function.

FIG. 1 shows an "open" system, as the top of conduit D is vented to the atmosphere. It should be appreciated that the principles upon which the present invention are based will operate whether the system is opened or closed, as long as the pressure within the container above the liquid surface and within outlet tube C below orifice 12 are equalized.

When the apparatus of the present invention is utilized to measure milk yield, the system must be closed in order to prevent contamination and to create a vacuum therein. FIGS. 2-5 show alternate embodiments of the apparatus of the present invention, each of which is a closed system and, therefore, suitable for use with milk.

Figure 2:
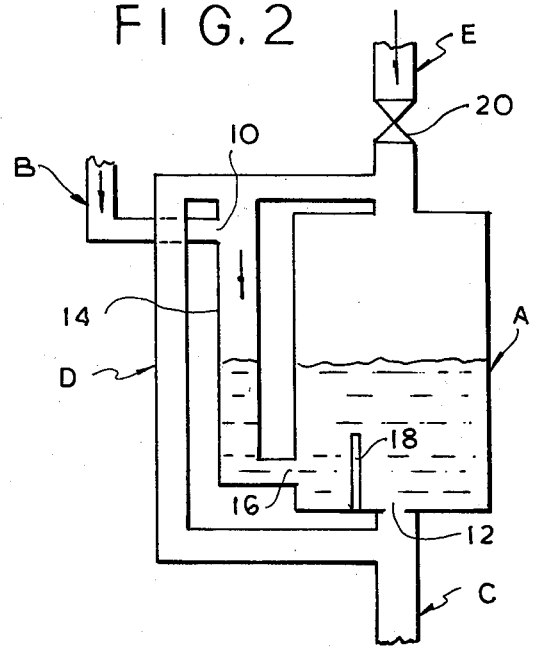

In the embodiment shown in FIG. 2, container A includes an exterior conduit 14 which is connected to receive liquid from inlet tube B. The liquid flows through conduit 14 and into the main portion of container A through a port 16. To eliminate a whirlpool effect over the orifice 12, which may adversely influence the outlet velocity through the orifice, a vertically extending member 18 is provided near the mouth of orifice 12. As in FIG. 1, a pressure equalizing conduit D is provided which connects the top of container A with outlet tube C below orifice 12.

As noted above, when the apparatus of the present invention is used in order to measure milk flow rate, it is necessary that the apparatus be thoroughly cleaned periodically to reduce the possibilities of contamination. The cleansing process can be accomplished by causing a suitable cleaning fluid to flush the apparatus. Because there are no hidden corners or recesses in the apparatus, flushing with the appropriate cleaning fluid provides the necessary cleaning action.

In order to facilitate the cleaning operation, a conduit, generally designated E, is provided to connect the upper portion of container A, as well as conduits 14 and D, with a source of cleaning fluid (not shown). Conduit E is connected to the remainder of the apparatus through a valve or stop-cock 20 of conventional design. Valve 20 would normally be open while the apparatus is in operation and would be closed or opened to cause the cleaning fluid to flush the apparatus, when required.

Figure 3:
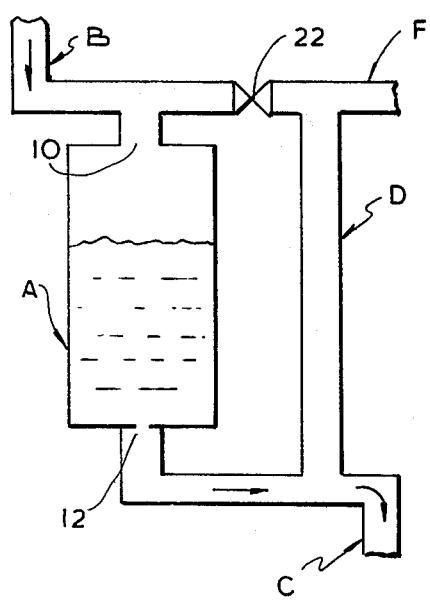

It is desirable to design the present invention such that same can be utilized in conjunction with an automatic milking machine of conventional design. Such milking machines utilize a suction system in order to obtain milk. FIG. 3 depicts such an apparatus. The embodiment shown in FIG. 3 is similar to that shown in FIG. 1, except that the upper portion of pressure equalizing conduit D is no longer vented to the atmosphere, but is now connected to a suction means (not shown) by a conduit, generally designated F. Conduit F is, in turn, connected to inlet tube B through a valve or stop-cock 22, such that the vacuum source may be controlled.

Figure 4:
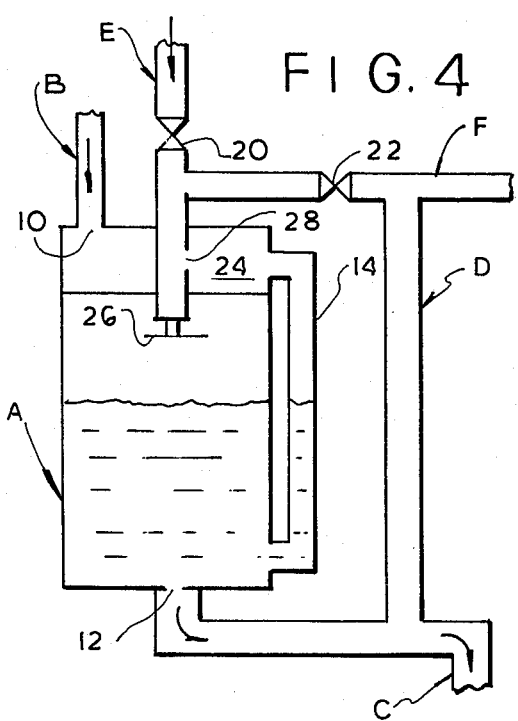

FIG. 4 illustrates an embodiment which is similar in structure to the embodiment shown in FIG. 2, in that container A has an external conduit 14 connected to inlet conduit B, in this case, through a chamber 24. However, the embodiment shown in FIG. 4 has the additional advantage of being connectable to the suction source of an automatic milking machine by means of conduit F. It should be also noted that, in the embodiment of FIG. 4, the cleaning fluid inlet tube E terminates within container A with a horizontal disc 26. Chamber 24 is provided between inlet tube B and container A, which acts as a settling chamber. Chamber 24 is connected to conduit E through an opening 28.

The embodiment shown in FIG. 5 differs from the embodiment shown in FIG. 4 in that container A has a concentric tube configuration. In this case, inlet tube B extends down the entire length of container A to the bottom thereof. The interior of inlet tube B is connected to the interior of container A by means of inlet ports 10. A pair of conduits 30 are provided for connecting the upper portion of container A with a conduit 32, which, in turn, is connected through valve 22 to conduit F and conduit D, as well as conduit E, through valve 20. The structure of the embodiment shown in FIG. 5 is particularly useful when a capacitance-type measuring system is used, as described below.

Various methods can be utilized to sense the level of liquid within container A and to convert the sensed quantity into a number representative of the instantaneous liquid flow rate and, if desired, into a number representing the total yield from a particular cow. In general, a means, generally designated G, is provided for generating a signal representative of the instantaneous rate of liquid flow through the container. This means can take a variety of different forms, which can be conveniently separated into two categories.

Figure 6:
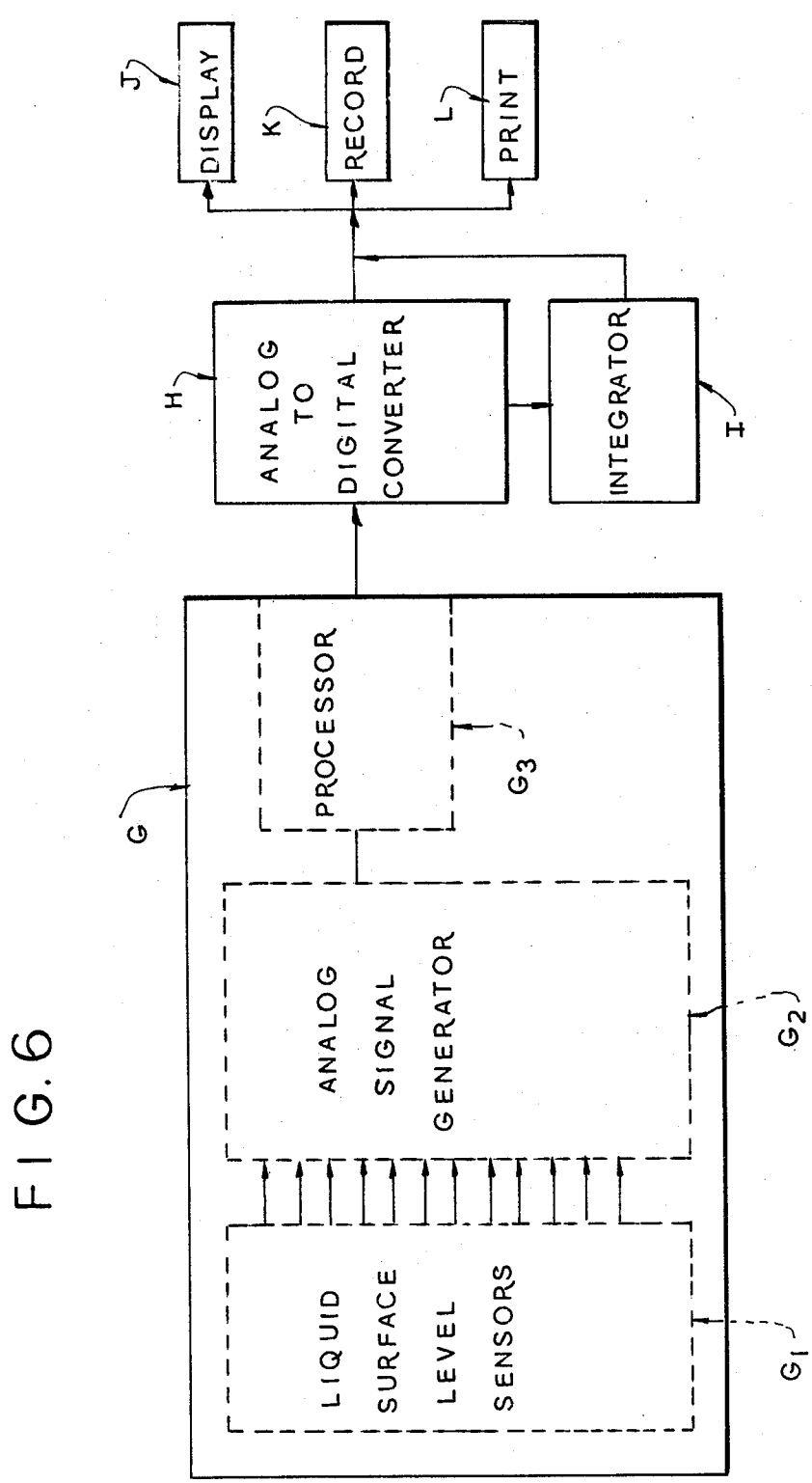
FIG. 6 shows, in block diagram form, a preferred embodiment of the signal generating portion of the invention.

In the first category, illustrated in FIG. 6, the location of the liquid surface is sensed by a plurality of sensors which are situated along the side of container A. Each of these sensors generates an output which indicates whether or not a liquid is present. The sensors, in aggregate, comprise the liquid level sensing means $G_1$. The outputs of each of the individual sensors are applied to a multi-input means $G_2$ which generates an analog signal representative of the height of the liquid surface above the orifice. The signal generating means G incorporates a processing circuit $G_3$ which takes the square root of the output signal of means $G_2$ Thus, the output of the signal generating means G is directly proportional to the fluid flow rate.

The analog signal from the signal generating means G is applied to the input of a conventional analog-to-digital converter, generally designated H, which converts the analog signal into a digital number which represents the liquid flow rate. If desired, the digital output of the analog-to-digital converter H may also be applied to the input of a digital integration circuit, generally designated I, which will serve to integrate the digital output over a predetermined time interval, such as the time interval for milking a single cow. The digital output of integrater I is representative of the milk yield for the cow.

The digital output of analog-to-digital converter H (or of the integrater I) can be applied to the input of a conventional digital display device, such as a liquid crystal or LED display, generally designated J. In addition, if desired, these outputs can be applied to the input of any conventional digital memory, generally designated K, to record same for future use or to the input of a printer, generally designated L.

The structure of a portion of analog signal generating means $G_2$ is schematically illustrated in FIG. 7. As shown in FIG. 7, an output bus 40 is connected by means of a plurality of parallel circuit branches (only a few of which are illustrated) to a power bus 42, connected at one end thereof to a source 44. One branch of a parallel circuit is provided for each sensor. Each of the branches comprises a switch means S, which is any conventional electronically controllable switch having a control input and an output circuit. The output circuit is connected between power bus 42 and output bus 40. The control input for each switch means S is connected to the output of the corresponding sensor. In each of the parallel branches, situated between the switch means S and output bus 40, is a resistor $R_i$. When an actuation signal is received from a particular sensor, the switch means S associated therewith will close, connecting power bus 42 with output bus 40, through the resistor $R_i$ associated with that switch means.

Resistors $R_i$ are chosen in such a way that the resulting voltage on the output bus will depend upon an equivalent resistance of all of the branches of the parallel circuit which are connected to the output bus at that moment. This is a "cumulative" circuit.

On the other hand, sensors may be connected in such a way that only a single sensor, the one immediately below the liquid surface, will actuate an appropriate switch. Thus, the values of the resistors $R_i$ must be such that the voltage generated at output bus 40 is representative of only a particular sensor, that is, the sensor immediately below the liquid surface. This is a "differential" scheme of sensor connection.

The values of the resistors $R_i$ may be chosen in such a way that the output voltage (in either scheme—"cumulative" or "differential") will be either directly proportional to the liquid surface height or to the square root of the height and, thus, to the liquid flow rate at that moment. In the latter case, there is no need for a separate root extracting circuit.

FIG. 8 is a schematic diagram of a liquid level sensing means $G_1$ which employs a number of electrodes which operate to sense resistance levels, and an analog signal generating means $G_2$ which utilizes transistors as electronically controlled switches. In this instance, a number of openings are created in the wall of container A. Into each of these openings, an electrode 46 is situated. The electrode is then sealed in the opening to prevent the escape of liquid therethrough. At the bottom of container A, another electrode 48 is situated through an opening created therein. Electrode 48 is connected to ground so as to ground liquid within container A. Only three of the electrodes 46 are illustrated in FIG. 8. However, it should be appreciated that as many electrodes 46 can be used as is desired, and that the more electrodes used, the more accurate determination of the liquid height can be made.

Each electrode 46 is connected to a first input of a logic NAND gate 50. A second input to logic gate 50 is connected to the terminal of a power source 52. Power source 52 is connected to electrode 46 through a resistor 54. The value of resistor 54 is chosen such that it lies between the resistance offered by the liquid when current flows between each immersed wall electrode 46 and the grounded bottom electrode 48, and the resistance due to foam and a layer of liquid residue clinging to the chamber wall, after the liquid has receded.

When the resistance between a particular electrode 46 and electrode 48 drops, because the particular electrode 46 is immersed in the liquid and, therefore, a circuit is created between it and electrode 48 through the liquid, the gate 50 associated with the immersed electrode 46 closes, generating an actuation signal at its output.

Each of the gates 50 is connected to the control input of an associated switch means S, which, in this case, is a transistor T. Transistor T has its base or gate electrode connected to receive the output of the gate associated therewith. The output circuit of the transistor T is connected, in series, with a resistor $R_i$, between power bus 42 and output bus 40. When an actuation signal is generated from gate 50, the transistor T turns on, connecting power bus 42 to output bus 40 through resistor $R_i$. The voltage output on bus 40 will be representative of an equivalent resistance of all the parallel branches, connected to the output bus 40 at a particular moment and, thus, of the height of the liquid within container A at that moment.

FIG. 9 illustrates an embodiment wherein the sensors take the form of capacitor plates 60. Each of the capacitor plates 60 is affixed to the external wall of container A. Here again, the liquid within container A is grounded by means of an electrode 48, which is inserted through an opening on the bottom of container A and is connected to ground.

Figure 10:
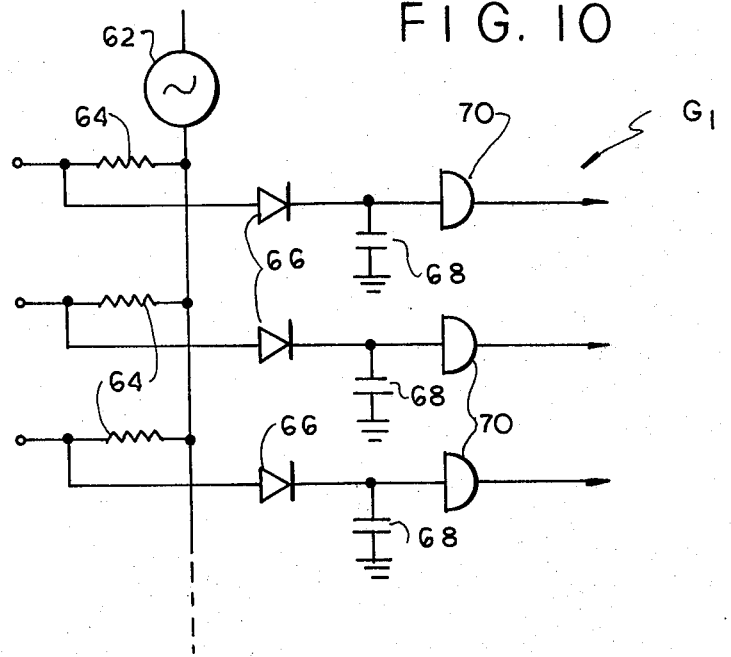
FIG. 10 shows a preferred embodiment of the analog signal generating means of the present invention designed to be used in conjunction with the sensors illustrated in FIG. 9.

FIG. 10 shows one version of the electronics which are suitable for use with the plate sensors shown in FIG. 9. In this case, an AC source 62 is connected to each plate 60 through a resistor 64, all of which are of equal value. The value of the resistors 64 defines the threshold voltage of the branches of the parallel circuit. Each of the plates 60 is connected to one terminal of a diode 66, which acts as a rectifier. The other terminal of each diode 66 is connected, by means of a line which is grounded through a capacitor 68, to one terminal of a gate 70, such as a transistor. If the voltage received by the gate 70 is higher than a preset value, the gate 70 will generate an output signal which will close the switch means associated therewith, as explained above. The capacitance of each of the plates 60 located below liquid surface will be much higher than the capacitance of the plates 60 which are above the liquid level. Thus, the switch means associated with the plates located below the liquid surface will all be closed, such that the output voltage will be representative of the height of the liquid within container A, when a cumulative circuit is used as the analog signal generating means.

Figure 11:
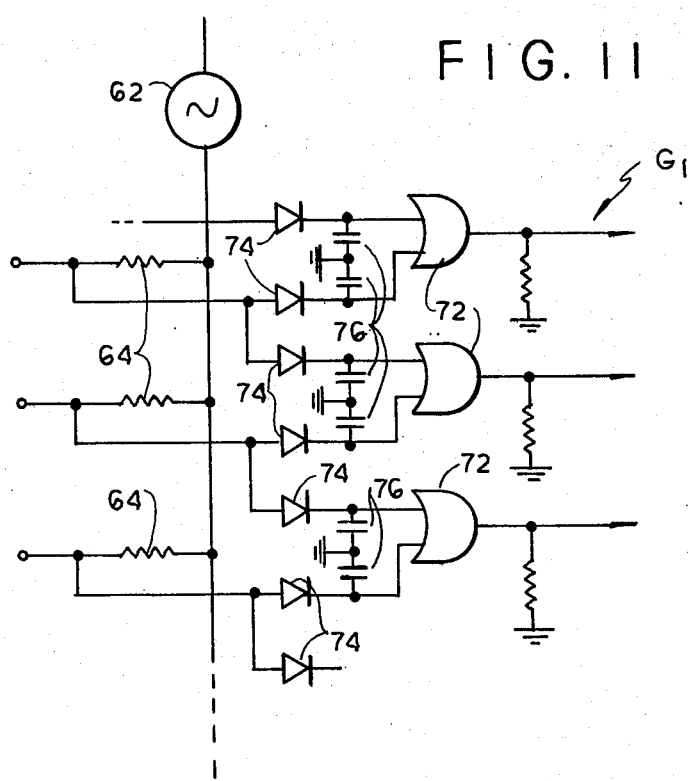
FIG. 11 shows another preferred embodiment of the analog signal generating means which can be used in conjunction with the sensors of FIG. 9.

FIG. 11 illustrates another embodiment of the electronics which can be used in conjunction with the sensors depicted in FIG. 9. As in the FIG. 10 embodiment, AC source 62 is connected to each of the plates 60 through a resistor 64. Each of the resistors 64 preferably has the same value.

Adjacent plates 60 are connected to the respective inputs of an exclusive OR gate 72, through rectifying diodes 74. The lines connecting the outputs of diodes 74 to the inputs of gates 72 are grounded by means of capacitors 76. Gates 72 react only when their input terminals receive voltages of different magnitudes, that is, only when they are connected to plates of different capacitances, caused by their positions on either side of the liquid surface level. The gates are tuned to a threshold difference in order to prevent their reaction to small electric disturbances or noise.

All of the capacitor plates positioned, at a certain moment, below the liquid level, have a relatively high charge of substantially equal magnitude, which results in substantially equal voltages at the gate terminals connected thereto. Likewise, all capacitor plates above the liquid level have a relatively low charge and result in substantially equal low voltages at the gate terminals. However, the gate which is connected to plates just above and below the liquid level will receive different voltages at its inputs and, thereby, generate an actuation signal to the switch means S associated therewith. Since each of the resistors R associated with the switch means S has a different value, the voltage generated by the analog signal generating means will be representative of the liquid level in the container.

FIG. 12 shows another preferred embodiment of the present invention, wherein the sensors each comprise a coil 80 which surrounds a portion of the container. Each of the coils 80 is spaced from adjacent coils along the container wall. Each coil 80 is connected to a different oscillator 82, all of which are tuned to the same frequency. Each of the oscillators is connected to a different frequency discriminator circuit 84. A second input of each of the frequency discriminator circuits 84 is connected to the output of a reference oscillator 85. Reference oscillator 85 is also tuned to the same frequency as each of the oscillators 82. A float, such as is illustrated in FIG. 14, composed of electrically conductive material, is situated within the container.

The presence of a float within one of the coils 80 will change the frequency of oscillation of that coil. This change is detected by the frequency discriminator connected to that coil, as the discriminator compares the frequency of oscillation of the coil to the frequency of reference oscillator 85. The frequency discriminator circuit which detects the presence of the float within the coil connected thereto generates an actuation signal which closes the corresponding switch means. Since the resistors R connected to each of the switch means S are of different values, the voltage output of the analog signal generating means represents the liquid surface level.

FIG. 13 illustrates another embodiment of the present invention wherein the liquid level is detected by means of variations in light intensity. In this case, a number of separate light sources 86 are aligned in spaced positions on one side of the container and connected to be energized by a power source 88. On the opposite side of the container are a plurality of photosensitive signal generating means 90 such as photo-cells or the like, each of which is situated to receive the light from a different source 86. Since milk within container A is opaque, only the photo-cells 90 located above the liquid level will receive light from the corresponding light source 86. The photo-electric cells 90 receiving light from the corresponding light sources 86 generate actuation signals to the corresponding switch means S to close same. Thus, the voltage on output line 40 of the signal generating means corresponds to the liquid surface level.

FIG. 14 shows an embodiment wherein a magnetic float 92 is situated along a rod 94 or the like, vertically situated within container A. A plurality of sensors 96 are situated in spaced relation along the exterior of container A. Sensors 96 may be detectors which are actuated in accordance with the Hall effect or, alternatively, mechanical switches which are magnetically actuated by the float. In either case, the presence of the float adjacent a detector 96 causes that detector to generate an actuation signal to the corresponding switch means S. Each of the resistors R, connected to each of the switch means S, is of a different value, such that the resulting voltage from the analog signal generating means represents the detector closest to the float and, therefore, the level of liquid within the container A.

FIG. 15 shows a preferred embodiment wherein the total capacitance of the container is determined in order to generate an analog signal which is proportional to the liquid level within the container. As shown in FIG. 15, two spaced capacitor plates 98, 100 are situated on opposing sides of the exterior walls of container A, running substantially the entire vertical length thereof. One of the plates 98 is connected to ground. The other plate 100 is connected to capacitance sensing circuitry.

Figure 16:
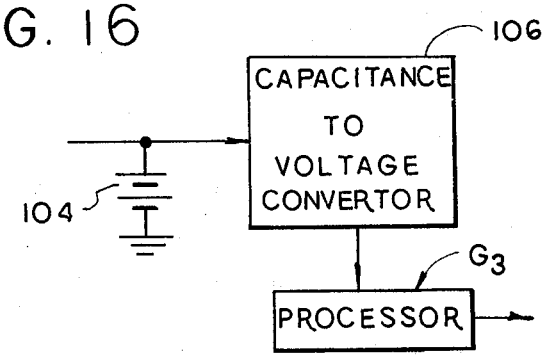
FIG. 16 is a block diagram of the analog signal generating means which can be used in conjunction with the liquid level sensing means illustrated in FIG. 15.

FIG. 16 illustrates, in block diagram form, the components of signal generating means G which can be used with the detectors of the embodiment shown in FIG. 15. One pole of a power source 104 is connected to the capacitor plate 100 in FIG. 15. This plate is also connected to the input of a capacitance-to-voltage converter circuit 106. The output of converter 106 is connected to a circuit $G_3$ which takes the square root of the converter output and multiplies by the appropriate constants. Thus, means $G_3$ generates an analog voltage which is proportional to the flow rate through container A.

Figure 17:
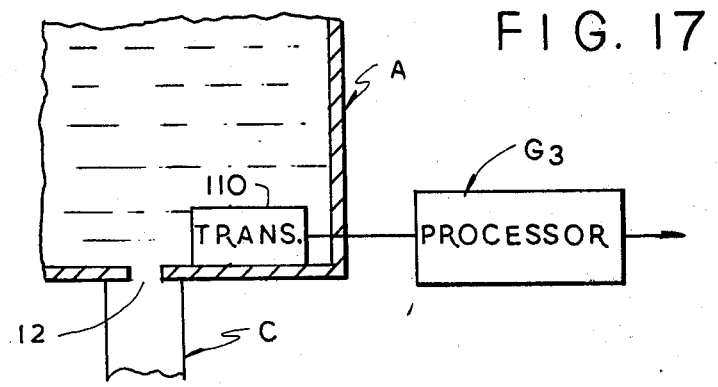
FIG. 17 illustrates a preferred embodiment of the liquid level sensing means which utilizes hydrostatic pressure to sense the liquid level.

FIG. 17 illustrates an embodiment wherein the hydrostatic pressure of the liquid, at a point immediately above the orifice, is determined by means of a conventional pressure transducer 110. The liquid flow rate is proportional to the square root of the hydrostatic pressure above the orifice. The output of the pressure transducer 110, after it is processed by a circuit such as $G_3$, will be an analog signal which is proportional to the flow rate through container A.

Figure 18:
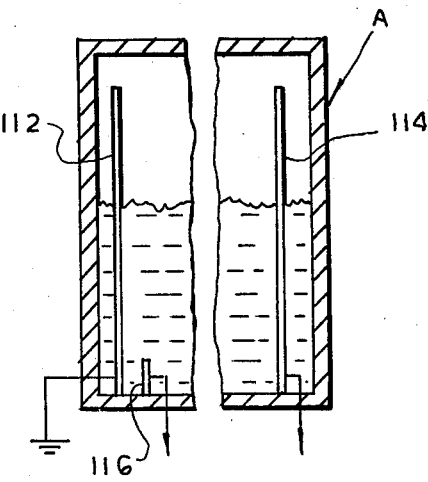
FIG. 18 is a preferred embodiment of the liquid level sensing means which utilizes the conductance of the liquid in order to determine liquid level.

FIG. 18 shows an embodiment wherein the liquid height is measured by means of two vertical electrodes 112, 114 which are immersed within the liquid in container A and measure the total conductance g of the liquid. In addition, at the bottom of container A, a small reference electrode 116 is provided at a fixed and known distance from electrode 112 and is used to measure the specific conductance $gR$ of the particular known amount of liquid flowing through the container. The information from the reference electrode is used to calibrate the results from the vertical electrodes 112 and 114, in a manner illustrated in block diagram form in FIG. 19. It is necessary to provide a reference measurement because the electrical conductance of milk is a function of its fat content, acidity and temperature and, thus, varies at each milking, from cow to cow, and during each milking cycle.

As shown in FIG. 19, a first conductance-to-voltage converter 118 is connected to electrode 114 and generates a voltage which is proportional to the conductance g of the entire quantity of liquid within the container A. A second conductance-to-voltage converter 120 generates a voltage which represents the conductance $gR$ of a constant reference quantity of liquid, which is directly proportional to the specific conductivity of the liquid. The output of converter 118 is divided by the output of converter 120 in a division circuit 122. The output of division circuit 122 is connected to the input of a processor circuit $G_3$ which takes the square root of the voltage and multiplies by the appropriate constants to generate a voltage which is proportional to the flow rate through container A.

FIG. 20 shows an embodiment wherein ultra-sonic detection is utilized to measure the liquid surface height. In this case, an ultra-sonic transducer 126 is situated within container A at the top thereof, so as to be spaced from the surface of the liquid therein. Transducer 126 includes an ultra-sonic transmitter 126a and an ultra-sonic receiver 126b. The determination of the liquid surface level is based on the measurement of the interval between the time an ultra-sonic signal is transmitted by the transceiver, traverses the distance between the transceiver and the liquid surface, is reflected from the liquid surface, and returns to the transceiver. The manner in which this is accomplished is shown in block diagram form in FIG. 21.

Transceiver 126 comprises a transmitter 126a and a receiver 126b. A "start" signal is generated from logic circuit 128 and causes a pulse from generator 130 to be applied to transmitter 126a, which generates a sound wave the duration of which is determined by the pulse. At the same time, a counter 132 begins counting clock pulses from a clock 134. The wave traverses the distance between the transmitter 126a and the liquid surface and is bounced from the liquid surface back to receiver 126b. When received by receiver 126b, a "stop" signal is generated to counter 132, causing it to cease counting. At this point, the count within counter 132 is reset. Computer 134 is a simple calculation circuit which will determine the distance between the transceiver 126 and the liquid surface based on the count in the counter and process this quantity to generate an output which is representative of the liquid height within the container, or its square root.

It will now be appreciated that the present invention relates to apparatus which can be used to meter liquid flow in a flow-through system which can be readily adapted to be connected to a suction-type automatic milking machine or the like. The apparatus includes an inlet tube, connected to a source of liquid which supplies liquid to a container through an inlet port. An orifice drains liquid from the container through an outlet tube, into which the liquid freely flows. The liquid level in the container is proportional to the square of the flow rate. A conduit connects the upper portion of the container, at a point above the liquid therein, and the outlet tube to equalize the pressure therebetween, as well as to act as an overflow bypass. Various types of devices may be used to sense the liquid level in the container and to generate a signal based on the sensed level. The signal is processed and the resulting signal is representative of the instantaneous rate of liquid flow.

In this manner, a flow-through design has been achieved which provides accurate results over a large range of flow velocities. In addition, the apparatus is readily cleanable as it may be connected to a source of cleaning fluid and has no corners or recesses to hinder the cleaning operation.

The apparatus includes electronic sensing devices of standard design which may be in a variety of different forms. The apparatus is readily adapted for use in conjunction with digital measuring, indicating and recording equipment. The apparatus is composed of simple, relatively inexpensive parts which interact reliably so as to provide a long, maintenance-free, useful life.

While only a limited number of preferred embodiments have been disclosed herein for purposes of illustration, it is obvious that many modifications and variations could be made thereto. It is intended to cover all of these variations and modifications which fall within the scope of the present invention, as defined by the following claims:

What is claimed is:

1. For use with a source of liquid, apparatus for measuring the flow of the liquid comprising an inlet tube connected to the source; a container, said container comprising an inlet port operably connected to said inlet tube such that liquid is supplied to said container;

an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said signal generating means comprising means for detecting the location of the surface of the liquid in said container and means for generating an analog signal representative of the detected location, said analog signal generating means comprising a voltage source, an output and a plurality of individually actuatable, parallelly situated switch means, each of said switch means having an output circuit operably connected between said voltage source and said output, and a control input, each of said switch means being effective, when said control input is actuated by said detecting means, to connect said voltage source to said output, said detecting means comprising a plurality of sensors, each of said sensors having an output operably connected to said control input of a different one of said switch means and effective to actuate same when said sensor is actuated, wherein each of said sensors comprises an electrode extending through the wall of said container and further comprising means for grounding the liquid in said container.

2. The apparatus of claim 1, wherein each of said electrodes is effective to actuate said switch means connected thereto when same is immersed in the liquid.

3. The apparatus of claim 1, wherein each of said electrodes is effective to actuate said switch means connected thereto when the resistance between said electrode and ground drops below a predetermined level.

4. For use with a source of liquid, apparatus for measuring the flow of the liquid comprising an inlet tube connected to the source; a container, said container comprising an inlet port operably connected to said inlet tube such that liquid is supplied to said container; an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said signal generating means comprising means for detecting the location of the surface of the liquid in said container and means for generating an analog signal representative of the detected location, said analog signal generating means comprising a voltage source, an output and a plurality of individually actuatable, parallelly situated switch means, each of said switch means having an output circuit operably connected between said voltage source and said output, and a control input, each of said switch means being effective, when said control input is actuated by said detecting means, to connect said voltage source to said output, said detecting means comprising a plurality of sensors, each of said sensors having an output operably connected to said control input of a different one of said switch means and effective to actuate same when said sensor is actuated, wherein each of said sensors comprises a conductive plate, affixed to the exterior of said container and further comprising means for grounding the liquid in the container and means for actuating said switch means associated with said plate when the capacitance of said plate is beyond a given level.

5. For use with a source of liquid, apparatus for measuring the flow of the liquid comprising an inlet tube connected to the source; a container, said container comprising an inlet port operably connected to said inlet tube such that liquid is supplied to said container; an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said signal generating means comprising means for detecting the location of the surface of the liquid in said container and means for generating an analog signal representative of the detected location, said analog signal generating means comprising a voltage source, an output and a plurality of individually actuatable, parallelly situated switch means, each of said switch means having an output circuit operably connected between said voltage source and said output, and a control input, each of said switch means being effective, when said control input is actuated by said detecting means, to connect said voltage source to said output, said detecting means comprising a plurality of sensors, each of said sensors having an output operably connected to said control input of a different one of said switch means and effective to actuate same when said sensor is actuated, and wherein each of said sensors comprises a conductive plate, affixed to the exterior of said container and further comprising means for grounding the liquid in the container, means for comparing the capacitance of adjacent plates and for actuating said switch means associated with the plate which has a capacitance different from the capacitance of one of the plates adjacent thereto.

6. For use with a source of liquid, apparatus for measuring the flow of the liquid comprising an inlet tube connected to the source; a container, said container comprising an inlet port operably connected to said inlet tube such that liquid is supplied to said container; an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said signal generating means comprising means for detecting the location of the surface of the liquid in said container and means for generating an analog signal representative of the detected location, said analog signal generating means comprising a voltage source, an output and a plurality of individually actuatable, parallelly situated switch means, each of said switch means having an output circuit operably connected between said voltage source and said output, and a control input, each of said switch means being effective, when said control input is actuated by said detecting means, to connect said voltage source to said output, said detecting means comprising a plurality of sensors, each of said sensors having an output operably connected to said control input of a different one of said switch means and effective to actuate same when said sensor is actuated, and wherein each of said sensors comprises a coil and an oscillator tuned to a given frequency and connected to said coil to excite same, each of said coils surrounding at least a portion of said container, and, further comprising a conductive float situated within said container, and a frequency discriminator means operably connected to said coils and effective, when the frequency of one of the coils differs from that of another of said coils by a predetermined value, due to the presence of the float therein, to generate an actuation signal to said switch means associated with said sensor.

7. For use with a source of liquid, apparatus for measuring the flow of the liquid comprising an inlet tube connected to the source; a container, said container comprising an inlet port operably connected to said inlet tube such that liquid is supplied to said container; an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said signal generating means comprising means for detecting the location of the surface of the liquid in said container and means for generating an analog signal representative of the detected location, said analog signal generating means comprising a voltage source, an output and a plurality of individually actuatable, parallelly situated switch means, each of said switch means having an output circit operably connected between said voltage source and said output, and a control input, each of said switch means being effective, when said control input is actuated by said detecting means, to connect said voltage source to said output, said detecting means comprising a plurality of sensors, each of said sensors having an output operably connected to said control input of a different one of said switch means and effective to actuate same when said sensor is actuated, each of said sensors comprising photo-sensitive signal generating means and a light source, said photo-sensitive means generating an actuation signal to the switch means associated therewith when light from the corresponding light source is detected.

8. For use with a source of liquid, apparatus for measuring the flow of the liquid comprising an inlet tube connected to the source; a enclosed container, said container comprising an inlet port operably connected to said inlet tube such that liquid is supplied to said container; an orifice situated to permit liquid to drain from said container; an outlet tube operably connected to said orifice; means operably connecting said container, at a point above the liquid therein, and said outlet tube, for equalizing the pressure therebetween; and means for sensing the level of liquid in said container and for generating a signal representative of the instantaneous rate of liquid flow through said container in accordance with said sensed level, said sensing means comprising ultrasonic detection means.

9. For use with a source of liquid, apparatus for measuring the flow of the liquid comprising an inlet tube connected to the source; a container, said container comprising an inlet port operably connected to said inlet tube such that liquid is supplied to said container; an unobstructed orifice situated on the bottom of the container to permit liquid to drain from the container; an outlet tube operably connected to said orifice; means operably connecting said container, at a point above the liquid therein, and said outlet tube for equalizing the pressure therebetween; and means for sensing the level of liquid in said container and for generating a signal representative of the instantaneous rate of liquid flow through said container in accordance with said sensed level, said sensing means comprising a pressure transducer located adjacent the bottom of said container proximate said orifice so as to measure the hydrostatic pressure above said orifice.

* * * * *